US 6,465,771 B2
Oct. 15, 2002

(12) United States Patent
Ohsawa

(54) ANGULAR VELOCITY DETECTOR AND APPARATUS HAVING ANGULAR VELOCITY DETECTOR

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 7 days.

(21) Appl. No.: 09/731,274

(22) Filed: Dec. 6, 2000

(65) Prior Publication Data

US 2001/0015406 A1 Aug. 23, 2001

(30) Foreign Application Priority Data

Dec. 7, 1999 (JP) .......................................... 11-347801

(51) Int. Cl.[7] .............................................. G01C 19/66
(52) U.S. Cl. ............................ 250/231.12; 250/231.18; 356/459; 372/94
(58) Field of Search ...................... 250/231.12, 231.18; 356/27, 28, 149, 459, 461, 463; 372/94

(56) References Cited

U.S. PATENT DOCUMENTS

| | | | | |
|---|---|---|---|---|
| 5,037,203 A | * | 8/1991 | Yeh .............................. | 356/459 |
| 5,400,141 A | * | 3/1995 | Albers et al. ................ | 356/473 |
| 5,469,258 A | * | 11/1995 | Grasso ......................... | 356/469 |
| 5,764,681 A | * | 6/1998 | Ballantyne et al. ........... | 372/94 |
| 6,275,296 B1 | * | 8/2001 | Numai ......................... | 356/459 |
| 6,282,226 B1 | * | 8/2001 | Furukawa ..................... | 372/94 |
| 6,297,883 B1 | * | 10/2001 | Numai ......................... | 356/459 |
| 6,304,329 B1 | * | 10/2001 | Nitta et al. ................... | 356/459 |
| 2002/0021447 A1 | * | 2/2002 | Mizutani et al. ............. | 356/459 |

FOREIGN PATENT DOCUMENTS

| JP | 02000205863 A | * | 7/2000 |
|---|---|---|---|
| JP | 02000205864 A | * | 7/2000 |
| JP | 02000283768 A | * | 10/2000 |

* cited by examiner

Primary Examiner—Robert H. Kim
Assistant Examiner—Allen C. Ho
(74) Attorney, Agent, or Firm—Morgan & Finnegan, LLP

(57) ABSTRACT

An angular velocity detector comprising a ring laser having a tapered light waveguide path which has an asymmetrical shape at least in a portion of the tapered light waveguide path so that laser beams propagating circumferentially in rotational directions reverse to each other have oscillation threshold values which are different from each other, an optical gyroscope having a terminal which detects a change of at least one of a current, a voltage and impedance of the ring laser, a measuring device for measuring information of a period or a frequency of the current, the voltage and the impedance outputted from the terminal of the above described optical gyroscope, a first output circuit for outputting information of the period or the frequency of at least one of the current, the voltage and the impedance outputted from the above described terminal when the above described optical gyroscope is not subjected to an angular velocity, and a calculation circuit for inputting a result measured by the above described measuring device and the information of the above described period or the frequency outputted from the above described first output circuit, and performing calculation on information of an angular velocity.

16 Claims, 13 Drawing Sheets

ANGULAR VELOCITY DETECTOR AND APPARATUS HAVING ANGULAR VELOCITY DETECTOR

BACKGROUND OF THE INVENTION

1. Field of the Invention

The present invention relates to a angular velocity detector, and more specifically an apparatus which detects a rotational angular velocity utilizing a ring laser type gyroscope.

2. Related Background Art

Conventionally known as gyroscopes for detecting angular velocities of moving bodies are mechanical gyroscopes having rotors and oscillators as well optical gyroscopes. The optical gyroscopes in particular which can be started momentarily and have broad dynamic ranges are renovating the art of gyroscope technology. The optical gyroscopes are classified into a ring laser type gyroscope, an optical fiber gyroscope, a passive type ring resonator gyroscope and so on. Out of these optical gyroscopes, the ring laser type gyroscope which uses a gas laser was developed earliest and has already been put to practical used in aircrafts and so on. As a ring laser type gyroscope which is compact and has a high accuracy, there has recently been available a semiconductor laser gyroscope which is integrated on a semiconductor substrate.

FIG. 12 is a plan view illustrating an optical gyroscope which is capable of detecting not only an angular velocity but also a rotational direction. Reference numeral 10 denotes a quartz tube, reference numeral 11 denotes an asymmetrical tapered portion of a light waveguide path, reference numeral 12 denotes a mirror, reference numeral 13 denotes an anode, reference numeral 14 denotes an electrode terminal, reference numeral 15 denotes a cathode, reference numeral 100 denotes a counterclockwise laser beam and reference numeral 110 denotes a clockwise laser beam.

In a configuration described above, the quartz tube 10 is formed by boring a quartz block. Then, the mirror 12 is attached to the quartz tube 10. Furthermore, the anode 13, the electrode terminal 14 and the cathode 15 are attached to the quartz tube 10. Then, the quartz tube 10 is filled with helium gas and neon gas, and a voltage is applied across the anode and the cathode to start electric discharge and supply an electric current. The counterclockwise laser beam 100 and the clockwise laser beam 110 are oscillated in the quartz tube 10.

When the quartz tube 10 stands still, the laser beam 100 and the laser beam 110 have substantially the same oscillation frequency of $4.73 \times 10^{15}$ Hz and an oscillation wavelength $\lambda$ of 632.8 nm. However, an oscillation threshold value for the laser beam 100 is smaller than that for the laser beam 110 since the tapered portion 11 of the light waveguide of the path has an asymmetrical shape. Accordingly, the laser beam 100 has an optical intensity which is higher than that of the laser beam 110. As a result, an oscillation frequency $f_1$ of the laser beam 100 is 20 MHz higher than an oscillation frequency $f_2$ of the laser beam 110. The laser beam 100 and the laser beam 110 interfere with each other in the quartz tube 10. A signal having an amplitude of 100 mV and a frequency of 20 MHz is obtained by adjusting a power source current so as to be constant and monitoring a voltage across the electrode terminal 14 and the cathode 15. In other words, a beat voltage can be detected even when the quartz tube 10 stands still.

When the quartz tube 10 is rotated clockwise at a velocity of 1 degree per second and a side of the resonator is 10 cm long, the oscillation frequency $f_1$ of the counterclockwise laser beam 100 is increased by 248.3 kHz. On the other hand, the oscillation frequency $f_2$ of the clockwise laser beam 110 is decreased by 248.3 kHz. Accordingly, the beat frequency is $(f_1-f_2)=20$ MHz+496.6 kHz. When the quartz tube 10 is rotated counterclockwise at a velocity of 1 degree per second, on the other hand, the beat frequency is $(f_1-f_2)=20$ MHz−496.6 MHz. Since absolute values of the increase and the decrease of the beat frequency are proportional to the rotational speeds and the rotational directions have one-to-one correspondence to the increase and decrease of the beat frequency, the optical gyroscope is capable of detecting not only rotational speeds but also rotational directions. Though the quartz tube 10 is driven with the constant current and changes of a terminal voltage are measured in this example, changes of a current supplied to a terminal may be detected when the quartz tube 10 is driven with a constant voltage. Furthermore, changes of impedance of electric discharge may be detected directly with an impedance meter. Though helium gas and neon gas are used in this example, any gas is usable so far as the gas can be excited by a laser beam. Furthermore, the light waveguide path may have any form which surrounds a rectangle, a hexagon, a triangle, a circle or the like.

The gyroscope indicates changes of a terminal voltage having a predetermined frequency due to interference between the laser beam 100 and 110 even in a standstill condition free from an angular velocity. Furthermore, this frequency is increased when a clockwise rotational angular velocity is applied to the gyroscope and decreased when a counterclockwise angular velocity is applied to the gyroscope.

FIG. 13A exemplifies changes of angular velocity applied to the gyroscope taking a positive side and a negative side of an angular velocity $\Omega=0$ as clockwise and counterclockwise respectively. An example of angular velocity traced in a solid line 51 indicates that a clockwise angular velocity changes into a counterclockwise angular velocity with time lapse.

FIG. 13B which shows changes of a terminal voltage Vg of the gyroscope corresponding to the changes of the angular velocity indicated by 51 indicates that a changing frequency a beat voltage changes lower as the angular velocity changes due to interference with a laser beam as indicated by a curve 52.

FIG. 13C is a voltage waveform diagram of a rectangular wave 53 which is obtained by comparing the terminal voltage indicated by 52 with a level of Vref shown in FIG. 13B. Information of the angular velocity can be obtained by measuring, for example, time intervals of rising edges of a voltage of the rectangular wave 53 or a number of edges within a predetermined time.

FIG. 14 shows relationship between an angular velocity applied to the gyroscope and a beat voltage taking a beat frequency at an angular velocity 0 as fo. In FIG. 14, a maximum angular velocity within a necessary range for detection is denoted as $\Omega mx$, a beat frequency at this angular velocity is denoted as fmx, a minimum angular velocity within the necessary range for detection is denoted as $\Omega mn$ and a beat frequency at this angular velocity is denoted as fmn. $\Omega o$ denotes an angular velocity at which the beat frequency is 0. A straight line 54 indicates that the beat frequency is enhanced as an angular velocity is increased in a clockwise direction and lowered as angular velocity is increased in a counterclockwise direction. Appliances which utilize built-in gyroscopes (for example, cameras, binoculars and navigators) have necessary ranges for detection of angular velocities and necessary detecting resolutions demanded dependently on characteristics of the appliances respectively. In a case where an angular velocity is detected with a gyroscope built in a still camera to prevent image blur, for example, it is sufficient, as already known, to detect the angular velocity with a resolution on the order of 0.1 degree/second within a range on the order of −20 to +20 degrees/second. In an example of the above described camera, $\Omega mx=+20$ degrees/second and $\Omega mn=-20$ degrees/second. Furthermore, there are a frequency characteristic and so on which are required dependently on characteristics of the appliances utilizing the built-in gyroscopes and in case of an image blur preventive system of the above described still camera, it is necessary to prevent a phase delay from exceeding ±15° within a range of DC to 30 Hz in particular taking an overall frequency characteristic of the system as a bandwidth on the order of DC to 100 Hz. For configuring a image blur preventive system for a still camera which satisfies such a frequency characteristic, it is known that angular velocity due to blur should be detected at a period of at least approximately 1 msec. taking into account a time required for digital operation processings.

The ring laser gyroscope which indicates information of angular velocities as frequency changes of a terminal voltage is incapable of satisfying the frequency characteristic of the above described system when the frequency changes of the terminal voltage at time intervals of detecting the angular velocities. Specifically, it is necessary in a system which must detect angular velocities at intervals of 1 msec. that the ring laser gyroscope outputs a beat frequency higher than at least 1 kHz (at intervals shorter than 1 msec.) to a terminal voltage over an entire necessary range for detection of the angular velocities.

Even though it is conceivable to adopt a processor circuit which detects angular velocities as voltage changes converted from frequency changes caused due to angular velocity changes with an FV converter circuit, an analog circuit such as an FV converter circuit comprises parts such as a capacitor and a resistor which can hardly be integrated, and such a processor circuit is not suited for use from viewpoints of a disposing space and a manufacturing cost in a case where such an angular velocity detector is to be disposed in a compact electronic appliance such as a camera in particular.

Furthermore, manufacturing variations of individual gyroscopes and changes of gyroscope characteristics caused by changes of environments of use make it impossible to detect angular velocities accurately.

The present invention therefore has a problem to provide an angular velocity detector which is suited for integration and is capable of accurately detecting angular velocities.

SUMMARY OF THE INVENTION

In one aspect of this invention, an angular velocity detector comprises a ring laser including a tapered light waveguide path which partially has such an asymmetrical shape as to differentiate oscillating threshold values for laser beams propagating circumferentially in rotational directions opposed to each other, an optical gyroscope having a terminal which detects current changes, voltage changes of impedance changes of the ring laser, a measuring device which measures information of periods or frequencies of changes of a current, a voltage or impedance outputted from the terminal of the optical gyroscope, and a first output circuit which outputs information of periods or frequencies of the changes of the current, the voltage or the impedance outputted from the above described terminal in a condition where an angular velocity is not applied to the above described optical gyroscope, and is configured to calculate information of angular velocities by inputting a result measured with the above described measuring device and the information of the above described periods or frequencies outputted from the above described first output circuit, suited for integration and capable of maintaining a high accuracy.

DESCRIPTION OF THE PREFERRED EMBODIMENTS

[First Embodiment]

A first embodiment will be described taking as an example an angular velocity detector which must detect an angular velocity within a range on the order of −120 to +120 degrees/second with a resolution on the order of 0.5 degree/second at intervals of 1 msec.

Figure 12:
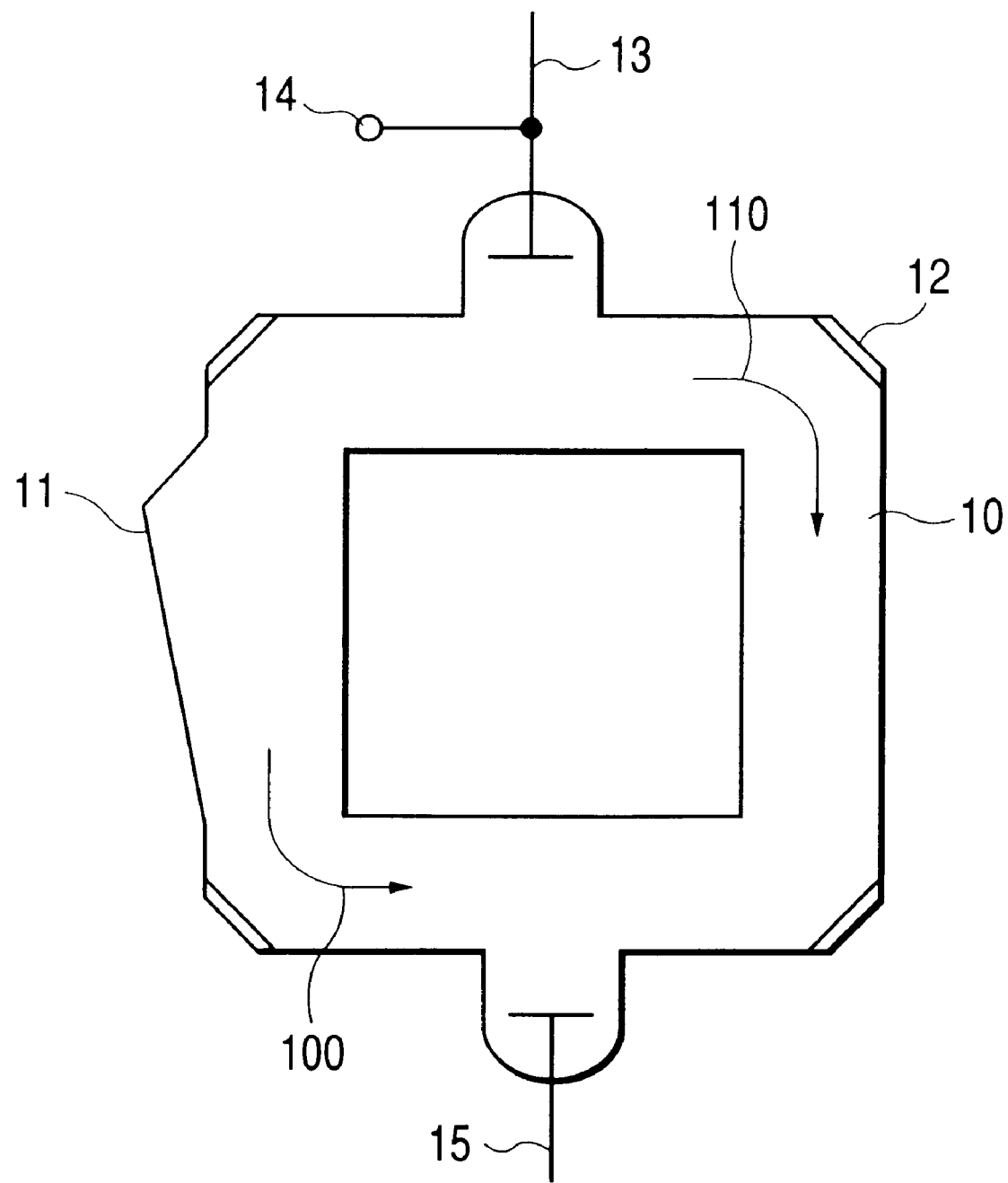
FIG. 12 is a plan view showing an example of ring laser gyroscope.
Figure 13A:
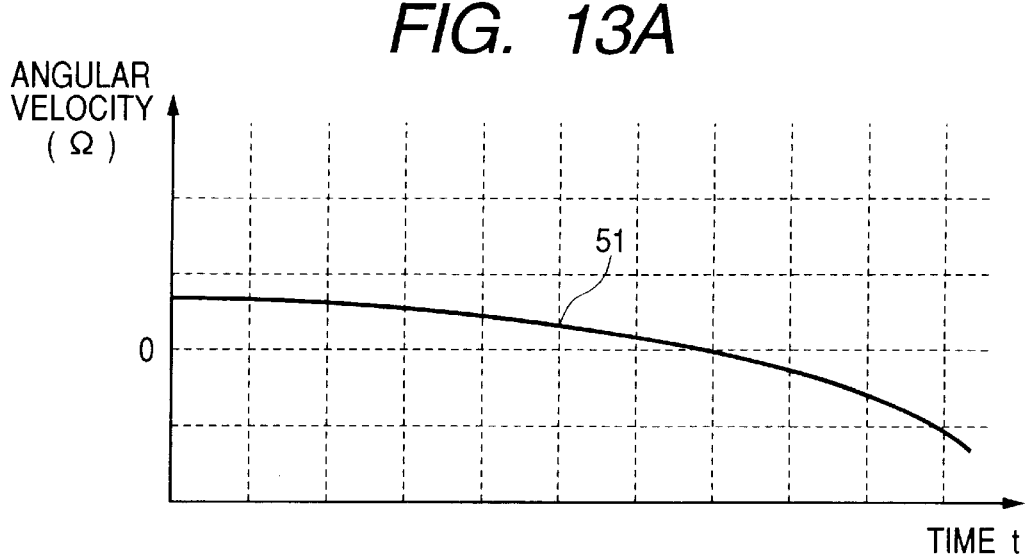
FIGS. 13A, 13B and 13C are a graph showing relationship between a terminal voltage of a ring laser and an angular velocity.
Figure 13B:
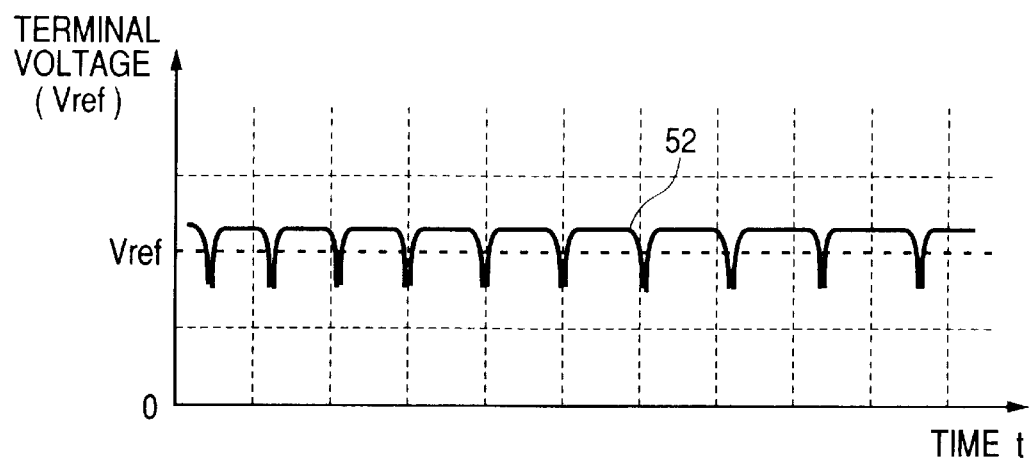
Figure 13C:
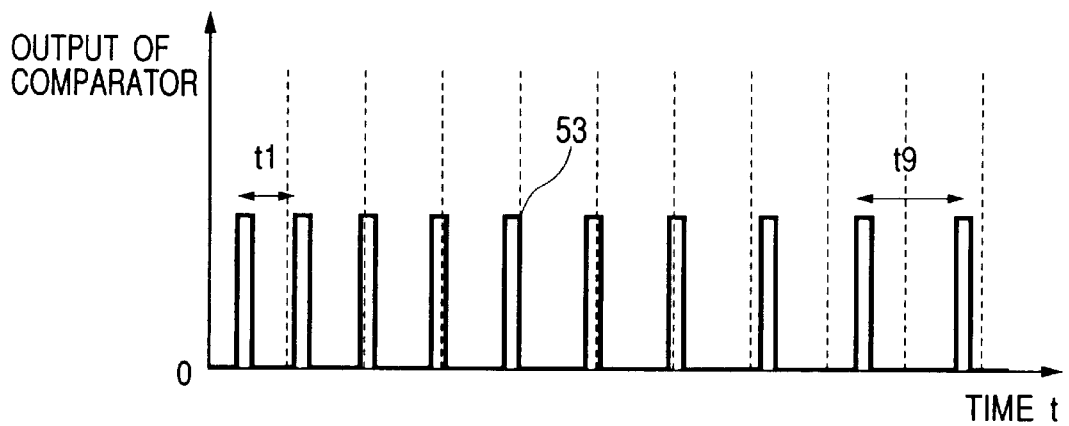

In the first embodiment, a ring laser gyroscope 10 is similar to a ring laser gyroscope which is shown in FIG. 12. By contriving a shape of a tapered portion 11 and optimalizing a value of a power source current, it is possible to obtain a gyroscope characteristic which gives a beat frequency fo=2 MHz, for example, at an angular velocity of 0. By selecting 20 cm as a length of a side of the gyroscope, it is possible to obtain a gyroscope characteristic which changes a beat frequency larger per unit angular velocity and gives a beat frequency fmn+1.338 MHz at an angular velocity $\Omega mn=-120$ degrees/second and a beat frequency fmx=2.662 MHz at an angular velocity $\Omega mx=+120$ degrees/ second. This gyroscope characteristic sufficiently satisfies the above described requirement that a beat frequency is higher than at least 1 kHz over the entire necessary range for detection.

Figure 1:
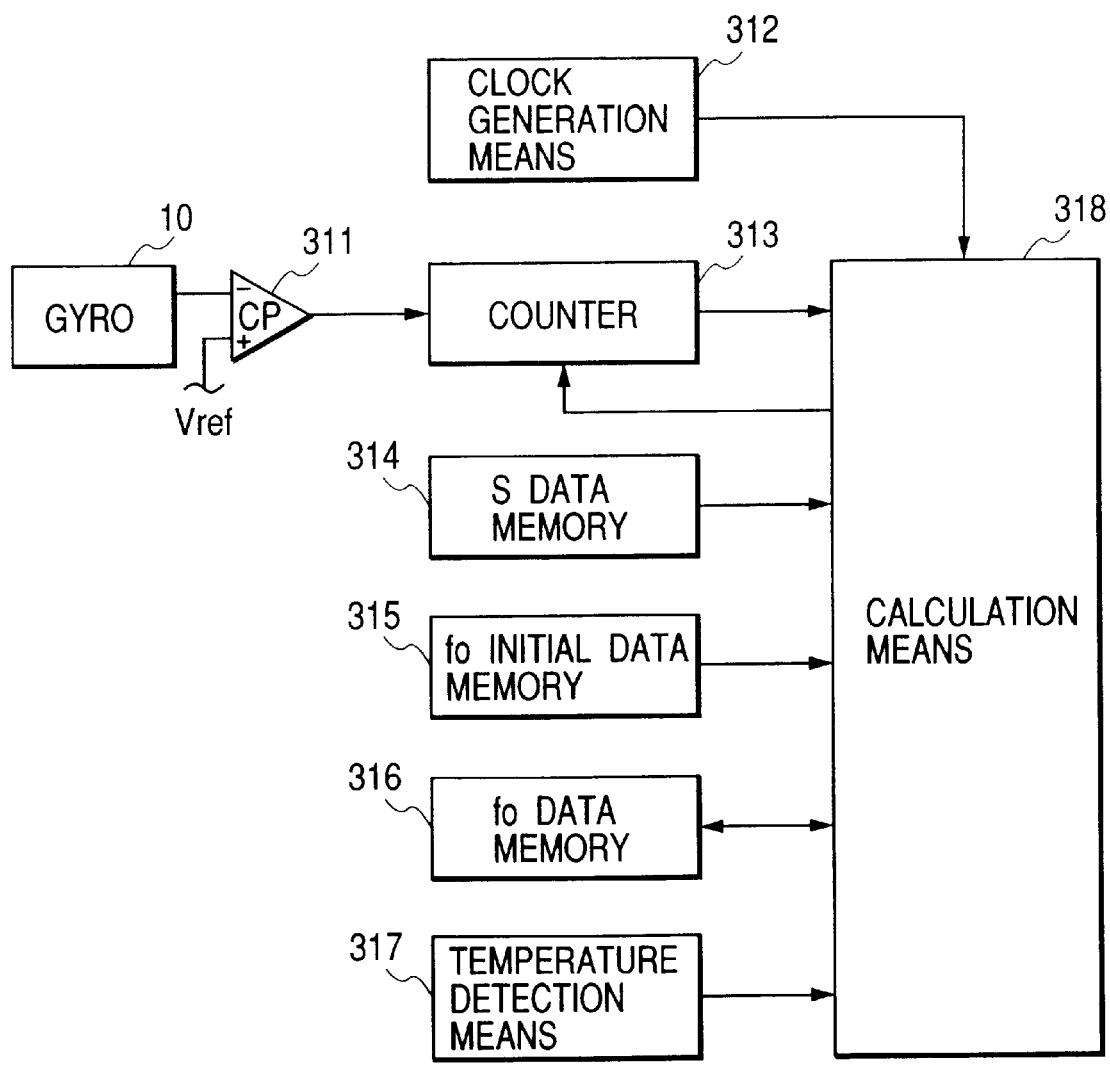
FIG. 1 is a block diagram showing an angular velocity detector according to a first embodiment.

FIG. 1 shows an example of specific circuit configuration of an angular velocity detector which obtains angular velocity information by detecting a beat frequency which a ring laser gyroscope outputs to a terminal voltage. That is, the ring laser gyroscope 10 according to the first embodiment is configured by members including the ring laser gyroscope 10 which are described below.

A comparator 311 compares a terminal voltage of the ring laser gyroscope 10 input to a negative input terminal with Vref input to a positive input terminal and outputs a pulse waveform obtained by comparison.

Clock generation means 312 consists of an oscillator circuit and a frequency divider circuit or the like, generates sampling clocks of 1 kHz and outputs the sampling clocks to calculation means 318 described later. A counter 313 counts the number of rising edges or falling edges of a pulse waveform outputted from the comparator 311. Reference numeral 314 denotes a memory which stores data of a sensitivity of the gyroscope 10 and reference numeral 315 denotes a memory which stores initial value data of a beat frequency at an angular velocity of 0 so that the data is read by the calculation means 318 described later.

Reference numeral 316 denotes a memory which stores data of the beat frequency at the angular velocity of 0 of the gyroscope 10 so that the data is read by the calculation means 318 described later.

Reference numeral 317 denotes temperature detection means which outputs information of temperatures in an operating environment of the gyroscope 10 to the calculation means 318 described later.

The calculation means 318 is configured by a microcomputer, for example, operates according to the clocks generated by the clock generation means 312, and calculates an angular velocity from information outputted from the counter 313, the memory 314, the memory 315, the memory 316 and the temperature detection means 317. Specifically, the calculation means 318 performs the following calculations.

Figure 14:
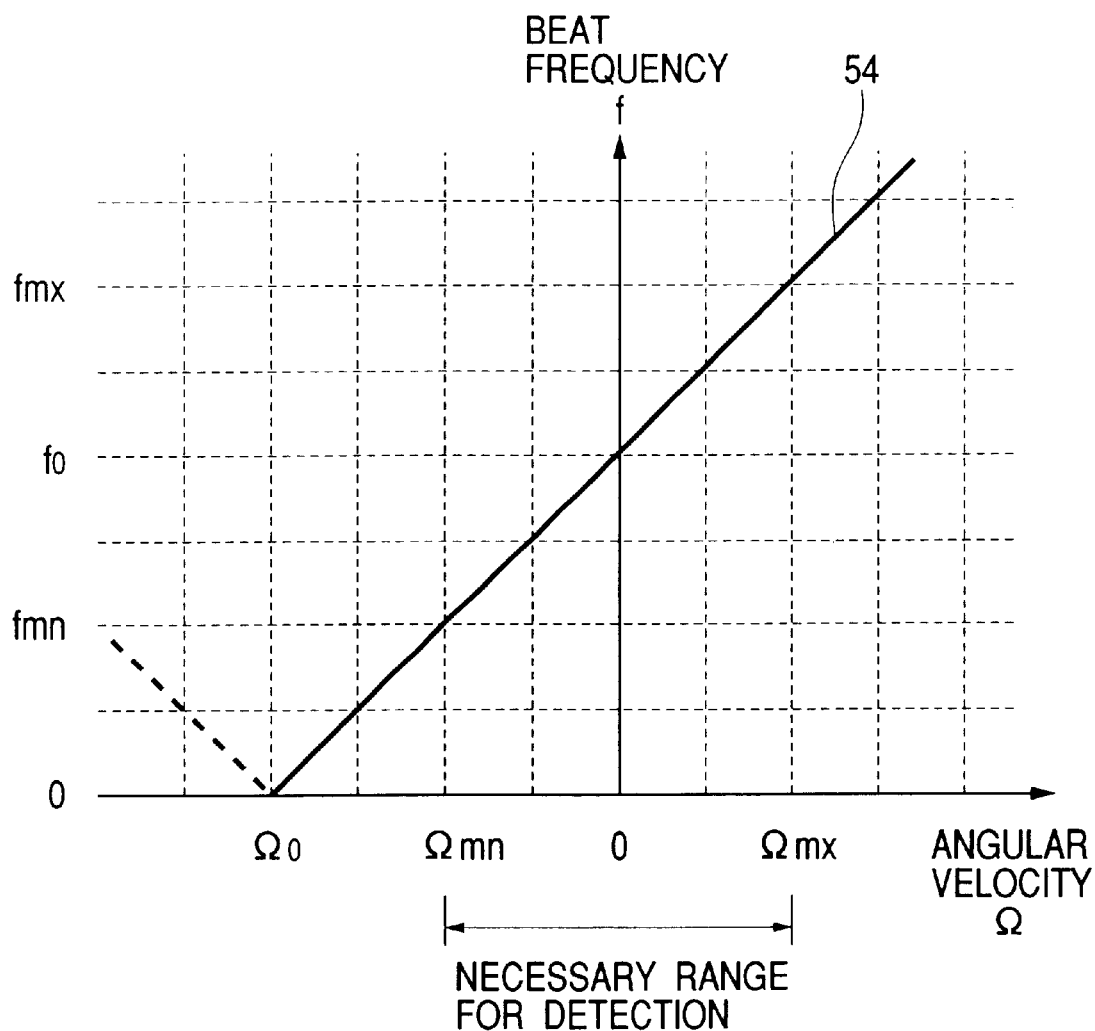
FIG. 14 is a graph showing relationship between an angular velocity applied to a gyroscope and a beat voltage.

A beat frequency f expressed by formula (1):

$$f = S \times \Omega + fo \quad (1)$$

wherein reference character S represents an inclination of the straight line 54 shown in FIG. 14 which represents a change of the beat frequency per unit angular velocity and can be said as a sensitivity of the gyroscope. From formula (1), an angular velocity $\Omega$ is expressed by equation (2):

$$\Omega = (f - fo) \div S \quad (2)$$

According to equation (2), the calculation means 318 is capable of calculating an angular velocity $\Omega$ which is currently applied to the gyroscope 10 when a current beat frequency f outputted from the gyroscope 10, the beat frequency fo also outputted from the gyroscope 10 at the angular velocity of 0 and the sensitivity S of the gyroscope 10 are known.

The calculation means 318 reads count data from the counter 313 at intervals of 1 msec. according to the clocks of 1 kHz generated by the clock generation means 312. When the count data has been read, the count data in the counter 313 is reset. Accordingly, the count data read at this step is a beat frequency component appearing on the terminal of the gyroscope 10 for 1 msec.

In case of the gyroscope having the characteristic which provides the beat frequency fo=2 MHz at the angular velocity of 0, a beat frequency fmn=1.338 MHz at the angular velocity $\Omega$mn=−120 degrees/second and the beat frequency fmx=2.662 MHz at the angular velocity $\Omega$mx=+120 degrees/second, beat frequency is fmn=1.338 MHz at the angular velocity $\Omega$mn=−120 degrees/second and a beat frequency is f=1.340 MHz at an angular velocity $\Omega$=−119.5 degrees/second. Since the count data for 1 msec. is 1338 counts at the beat frequency fmn=1.338 MHz, and the count data is 1340 counts for 1 msec. at the beat frequency f=1.340 MHz, the angular velocity detector can have the resolution of 0.5 degree/second for sampling at the intervals of 1 msec. Frequency information in Hz unit can be obtained by multiplying the count data for 1 msec. by a factor of 1000.

Since information of the sensitivity S to be stored in the memory 314 is 5.516 kHz/(degree/second) in the above described ring laser gyroscope, this information can be stored in the memory 314. However, industrial products generally have individual manufacturing variations and the sensitivity S is also variable individually due to dimensional errors of the ring laser gyroscope as well as errors of an oscillating frequency of the laser and the like. When these individual errors are not allowable for detection of angular velocities, it is desirable to store the information of the sensitivity S stored in the memory 314 which has values different for individual bodies or individual layers.

Since the initial value data of the beat frequency at the angular velocity of 0 which is to be stored in the memory 315 is fo=2 MHz in the above described ring laser gyroscope, this information can be stored in the memory 315. Since this information has a value which is variable like that of the sensitivity S due to the dimensional errors of the ring laser gyroscope as well as errors of a driving current and so on, it is desirable to store the information of the initial value data of the beat frequency at the angular velocity of 0 which has values different for individual bodies or individual layers when these errors are not allowable for detection of angular velocities.

The calculation means 318 determines the data of the beat frequency at the angular velocity of 0 which is to be stored in the memory 316 by calculating a mean value data of beat frequencies actually detected from the ring laser gyroscope for a definite time and stores this data into the memory 316. This data is stored to allow angular velocities to be detected accurately even when a beat frequency at the angular velocity of 0 actually indicated by the gyroscope changes with time from the initial value data of the beat frequency at the angular velocity of 0 which is stored in the memory 315 or dependently on operating environments. It is generally considered that an angular velocity is substantially 0 when angular velocities are detected for a definite time in a condition of use such as a fluctuation detecting mechanism for cameras where a gyroscope is subjected to random angular velocities and a mean value is calculated. Accordingly, it is considered that the mean value data of the beat frequencies actually detected from the ring laser gyroscope is data of the beat frequencies substantially at the angular velocity of 0.

When detection of an angular velocity is started, the calculation means 318 calculates an angular velocity $\Omega$ by the equation (2) using as f data input from the counter 313 at intervals of 1 msec. according to the clocks generated by the clock generation means 312, using the data stored in the memory 314 as S and using the data stored in the memory 315 as fo. In parallel with the calculation by the equation (2), the calculation means 318 adds the data input from the counter 313 at the intervals of 1 msec. Since a mean beat frequency for a second is obtained after addition of 1000 times, for example, the calculation means 318 stores this beat frequency into the memory 316 as the data of the beat frequency at the angular velocity of 0. The data may be divided by 1000 to store data for 1 msec.

When the data of the beat frequency at the angular velocity of 0 is stored into the memory 316, an angular velocity Ω is calculated using the data stored in the memory 316 as fo in place of the data stored in the memory 315. When the data stored in the memory 316 is different from the data stored in the memory 315 beyond a certain limit, however, the data stored in the memory 316 is regarded as lowly reliable and the data stored in the memory 315 is used for calculation. When variations of the data of the sensitivity S and the initial value data of the beat frequency at the angular velocity of 0 due to environmental temperatures cannot be ignored, these data must be corrected according to temperature data outputted from the temperature detection means 317. The calculation means may correct these data by calculation or the data of the sensitivity S and the initial value data of the beat frequency at the angular velocity of 0 may be stored in conditions classified for different temperatures.

[Second Embodiment]

Figure 2:
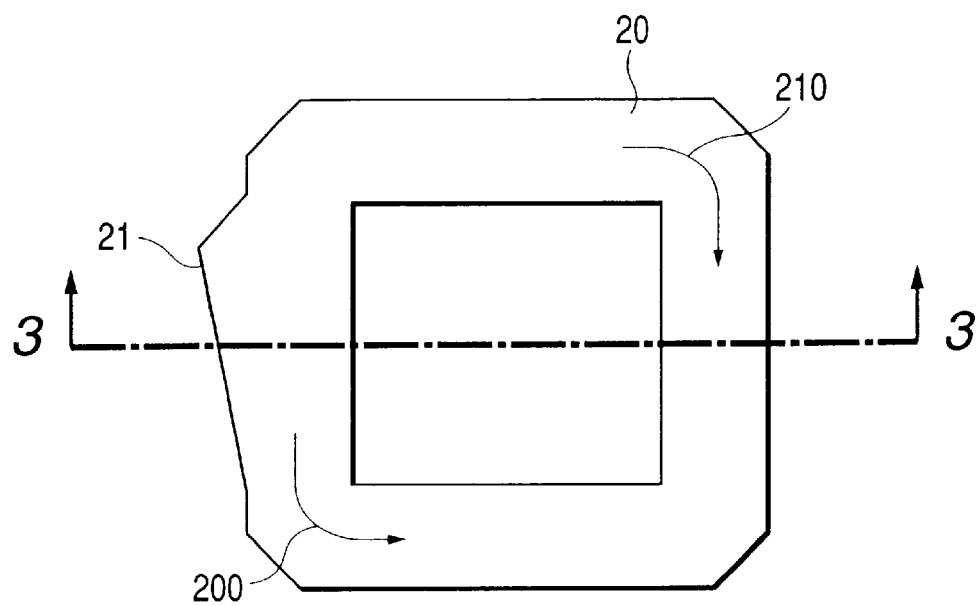
FIG. 2 is a plan view of a ring laser gyroscope used in an angular velocity detector according to a second embodiment.

FIG. 2 is a plan view of a ring laser gyroscope used in an angular velocity detector according to a second embodiment.

Figure 3:
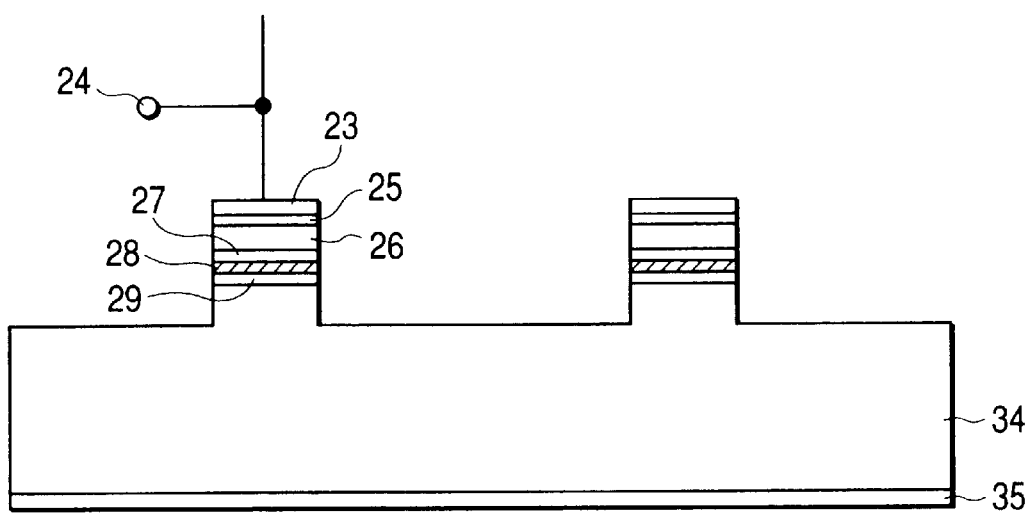
FIG. 3 is a sectional view of the ring laser gyroscope taken along an 3—3 line in FIG. 2.

FIG. 3 is a sectional view taken along an 3—3 line in FIG. 2.

In FIGS. 2 and 3, reference numeral 20 denotes a resonator type semiconductor laser, reference numeral 21 denotes an asymmetrical tapered portion of a light waveguide path, reference numeral 23 denotes an anode, reference numeral 24 denotes an electric terminal, reference numeral 25 denotes a cap layer, reference numeral 26 denotes a clad layer, reference numeral 27 denotes a light guide layer, reference numeral 28 denotes an active layer, reference numeral 29 denotes a light guide layer, reference numeral 34 denotes a semiconductor substrate, reference numeral 35 denotes a cathode, reference numeral 200 denotes a counterclockwise laser beam and reference numeral 210 denotes a clockwise laser beam.

A manufacturing method of the ring laser gyroscope having the above described configuration will be described. First, an undoped InGaAsp light guide layer 29 having 1.3 µm composition (0.15 µm thick), an undoped InGaAsp active layer 28 having a 1.55 µm composition (0.1 µm thick), an undoped InGaAsp light guide layer 27 having a 1.3 µm composition (0.15 µm thick), a p-Inp clad layer 26 (2 µm thick) and a p-InGaAsp cap layer 25 having a 1.4 µm composition (0.3 µm thick) are grown on an n-Inp substrate 34 (350 µm thick) using an organic metal gas phase growing method to compose the ring resonator type semiconductor laser 20. After crystals have grown up, photoresist AZ-1350 (prepared by Hochst) is coated over the p-Inp cap layer so as to obtain a film thickness of 1 µm using a spin coater. After prebaking at 80° C. for 30 minutes, a wafer is masked and exposed. A light waveguide path has a width of 5 µm after development and rinsing.

Thereafter, the wafer is introduced into an reactive ion etching apparatus and etched using chlorine gas until a depth of 3 µm is obtained.

Finally, Cr/Au is deposited as the anode 23 on the p-Inp cap layer 25. Furthermore, AuGe/Ni/Au is deposited as the cathode 35 on the n-Inp substrate. Then, the wafer is annealed in a hydrogen atmosphere to reserve an ohmic contact.

Since a semiconductor and air have different indices of refraction, reflection occurs on an interface in the above described configuration. Assuming that the semiconductor has an index of refraction of 3.5, total reflection occurs when an angle not smaller than 16.6 degrees is formed between a normal to the interface and a laser beam.

In a mode in which the ring laser gyroscope receives the total reflection, an oscillation threshold value is smaller than that in another mode due to loss caused by a mirror and oscillation starts at a low injection current level. Moreover, oscillation in the other mode is restrained since gain are concentrated in this oscillation mode.

A normal to the interface and the laser beam forms an angle of 45 degrees which satisfies a requirement for the total reflection. At room temperature an oscillation threshold value is 3 mA for the laser beam 200 and 3.5 mA for the laser beam 210.

The second embodiment will be described below taking as an example an angular velocity detector which must detect angular velocities within a range on the order of −20 to +20 degrees/second at intervals of 1 msec. with a resolution on the order of 0.1 degree/second.

In the second embodiment also, a beat frequency fo=2 kHz can be obtained at an angular velocity of 0, for example, by contriving a shape of the tapered portion 21 and optimalizing a value of a power source current.

Furthermore, it is possible by selecting 300 µm as a length of a side of the gyroscope to enlarge a variation of a beat frequency per unit angular velocity, and obtain the beat frequency fo=2 kHz at the angular velocity of 0, a beat frequency fmn=1.93244 kHz at an angular velocity Ωmn=+20 degree/second and a beat frequency fmx=2.06756 kHz at an angular velocity Ωmx=+°degrees/second.

Figure 4:
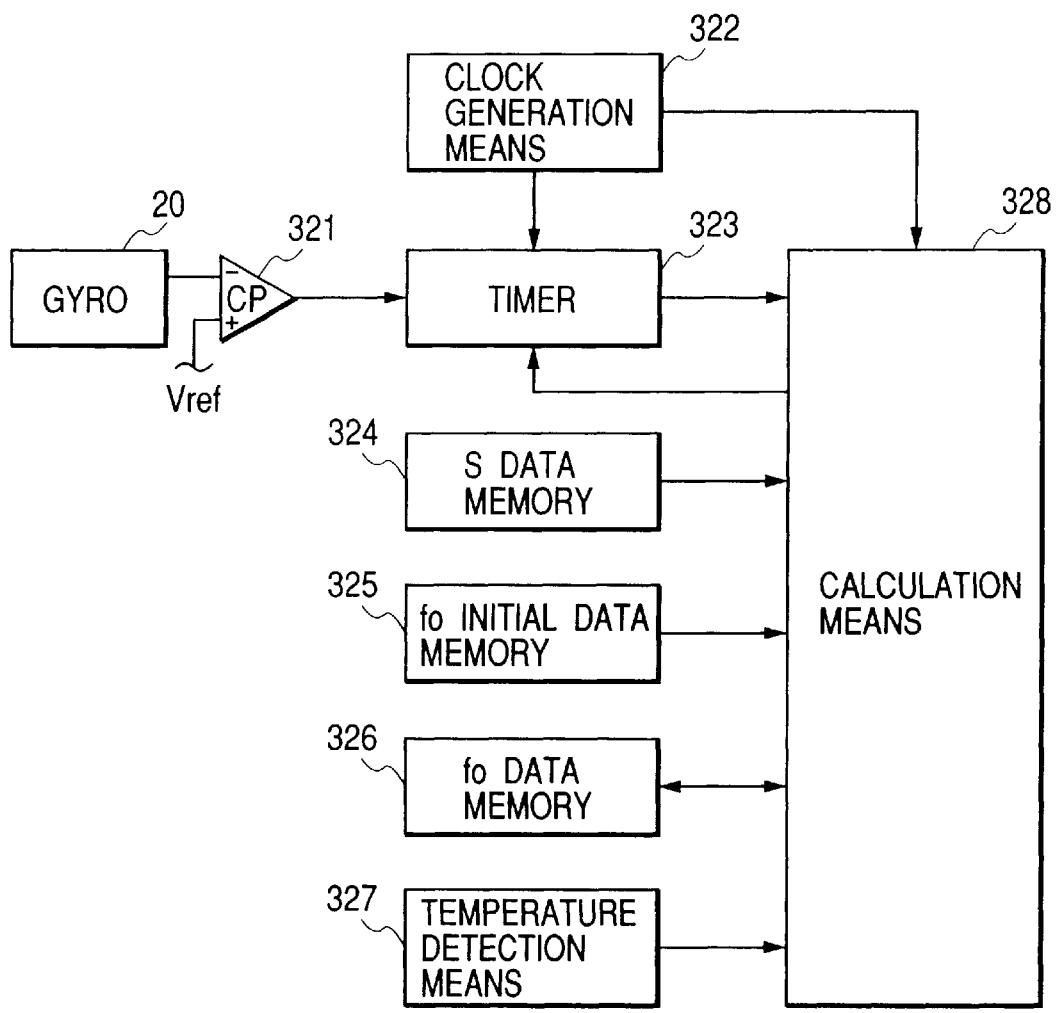
FIG. 4 is a block diagram of the angular velocity detector according to the second embodiment.

FIG. 4 is a block diagram showing an example of specific circuit of an angular velocity detector which obtains angular velocity information by detecting a beat frequency output to a terminal voltage of a ring laser gyroscope.

That is, the angular velocity detector according to the second embodiment is configured by members including the ring laser gyroscope 20 which are described below.

A comparator 321 compares a terminal voltage of the ring laser gyroscope 20 input to a negative input terminal with Vref input to a positive input terminal and outputs a pulse waveform obtained by the comparison.

Clock generation means 322 consists of an oscillator circuit, a frequency divider circuit or the like, generates sampling clocks of 1 kHz, outputs the sampling clocks to calculation means 328 described later, generates measuring clocks of 20 MHz and outputs these clocks to a timer 323 described later. The timer 323 counts the number of the above described clocks of 20 MHz at time intervals of rising edges or falling edges of the pulse waveform outputted from the comparator 321.

Reference numeral 324 denotes a memory for storing data of a sensitivity of the gyroscope 20 and reference numeral 325 denotes a memory for storing initial value data of a beat frequency at an angular velocity of 0, the data being read by calculation means 328 described later into each of the memories. Reference numeral 326 denotes a memory for storing data of the beat frequency at the angular velocity of 0 which is read and written by the calculation means 328 described later. Reference numeral 327 denotes temperature detection means which outputs information of a temperature in an operating environment of the gyroscope 20 to the calculation means 328 described later.

The calculation means 328 is configured by a microcomputer, for example, and operates according to the clocks generated by the clock generation means 322 to calculate an angular velocity from information outputted from the timer 323, the memory 324, the memory 325, the memory 326 and the temperature detection means 327. Specifically, the calculation means 328 calculates as described below.

A fundamental equation for calculating the angular velocity Ω is the same as the equation (2) described in the first embodiment.

The calculation means 328 reads count data from the timer 323 at intervals of 1 msec. according to the clocks of 1 kHz generated by the clock generation means 322. The count data outputted from the timer 323 is data of a time of a newest period of the beat frequency outputted from the gyroscope 20. Since period count data of 20 MHz from the timer 323 as the measuring clocks is 9673 when the beat frequency fmx is 2.06756 kHz at the angular velocity Ωmx=+20 degrees as described above and the period count data from the timer 323 is 9674 when a beat frequency f is 2.06722 kHz at an angular velocity Ω=+19.9 degrees/second, the angular velocity detector can have a resolution of an angular velocity difference of 0.1 degree/second. The data can be converted into frequency information in a Hz unit by a converting processing which multiplies an inverse number of the period count data by a factor of 20000000. Since the information of the sensitivity S to be stored in the memory 324 is 3.378 Hz (degree/second) in the above described ring laser gyroscope, this information can be stored into the memory 324. However, industrial products generally have individual manufacturing variations and the sensitivity S also has individual variations due to dimensional errors of the ring laser gyroscope as well as errors of a laser oscillation frequency and the like. When these individual errors are not allowable for detection of angular velocities, it is desirable to classify the information of the sensitivity S to be stored in the memory 324 dependently on values for the individual bodies or the individual layers.

Since the initial value data of the beat frequency at the angular velocity of 0 is fo=2 kHz in the ring laser gyroscope, this information can be stored in the memory 325. However, this value is also variable individually like the sensitivity S due to the dimensional errors of the ring laser gyroscope and the errors of the driving voltage and the like and it is desirable to classify the initial value information to be stored dependently on values for the individual bodies or the individual layers.

The calculation means 328 obtains the data of the beat frequency at the angular velocity of 0 to be stored into the memory 326 by determining mean value data for a definite time of a beat frequency actually detected from the ring laser gyroscope and stores the data into the memory 326. This data is stored for allowing angular velocities to be detected accurately even when beat frequency data actually indicated by the gyroscope changes from the initial value data of the beat frequency at the angular velocity of 0 stored in the memory 325 with time lapse or dependently on operating environments. It is generally considered that an angular velocity is substantially 0 when angular velocities are detected for a definite time or longer in a condition of use such as a fluctuation detecting mechanism for cameras where a gyroscope is subjected to random angular velocities and the angular velocities are averaged. Accordingly, it is considered that mean value data obtained by averaging beat frequencies actually detected from the ring laser gyroscope for a definite time is substantially data of a beat frequency at the angular velocity of 0.

When detection of an angular velocity is started, the calculation means 328 calculates an angular velocity Ω by the equation (2) using as f data of inverted number input from the timer 323 at intervals of 1 msec. according to the clocks generated by thee clock generation means 322, using the data stored in the memory 324 as S and using the data stored the memory 325 as fo as in the first embodiment. Furthermore, the calculation means 328 adds the data input from the timer 323 at intervals of 1 msec. in parallel with the calculation by the equation (2). Since a mean beat frequency for a second can be obtained by adding the data 1000 times and dividing total data by a factor of 1000, for example, such data is stores into the memory 326 as the data of the beat frequency at the angular velocity of 0. Dependently on a convenience for calculation processing, the period data or frequency data calculated in a reverse number may be stored.

When the data of the beat frequency at the angular velocity of 0 is stored into the memory 326, the calculation means 328 calculates an angular velocity Ω by the equation (2) using the data stored in the memory 326 as fo in place of the data stored in the memory 325. When the data store in the memory 326 is different from the data stored in the memory 325 beyond a definite limit, however, the data stored in the memory 326 is regarded as low in a reliability and the data stored in the memory 325 is used for the calculation.

When variations of the data of the sensitivity S and initial value data of the beat frequency at the angular velocity of 0 due to environmental temperatures cannot be ignored, it is necessary to correct these data according to the temperature data outputted from the temperature detection means 327 as in the first embodiment.

[Third Embodiment]

Though an arithmetic mean value of a sum of 1000data input from the timer 323 at the intervals of 1 msec. is used as the data of the beat frequency at the angular velocity of 0 and stored in the memory 328 in the second embodiment, the present invention is not limited by this embodiment.

Figure 5:
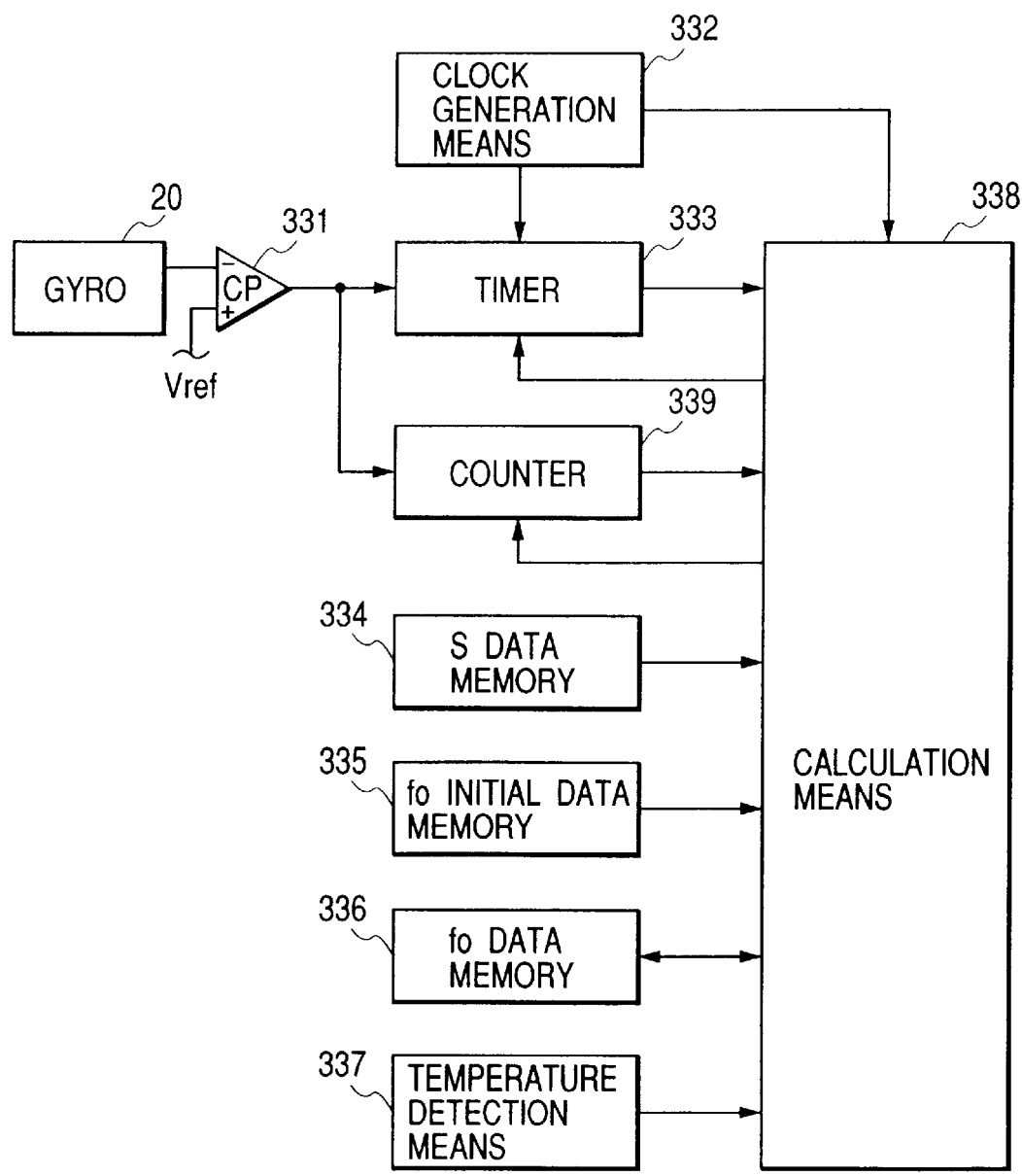
FIG. 5 is a block diagram of an angular velocity detector according to a third embodiment.

FIG. 5 shows a specific circuit configuration of an angular velocity detector which is partially different from that in the second embodiment.

That is, an angular velocity detector according to a third embodiment is configured by members including the ring laser gyroscope 20 which are described below.

A comparator 331 compares a terminal voltage input to the negative input terminal of the ring laser gyroscope 20 with Vref input to the positive input terminal and outputs a pulse waveform obtained by the comparison.

Clock generation means 332 consists of an oscillator circuit and a frequency divider circuit, generates sampling clocks of 1 kHz and 1 Hz, outputs these clocks to calculation means 338 described later, generates measuring clocks of 20 MHz and outputs these clocks to a timer 333 described later.

The timer 333 counts a number of the clocks of 20 MHz at time intervals of a rising edge and a falling edge of the pulse waveform outputted from the comparator 331.

Reference numeral 334 denotes a memory for storing data of a sensitivity of the gyroscope 20 and reference numeral 335 denotes a memory for storing initial value data of a beat frequency at an angular velocity of 0 of the gyroscope 20, the data being read by the calculation means 338 described later into each of the memories.

Reference numeral 336 denotes a memory for storing data of the beat frequency at the angular velocity of 0 which is read by the calculation means 338 described later.

Reference numeral 337 denotes temperature detection means which outputs information of a temperature in an operating environment of the gyroscope 20 to the calculation means 338 described later.

The calculation means 338 is configured by a microcomputer, for example, and operates according to the clocks generated by the clock generation means 332 to calculate an angular velocity from information outputted from the timer 333, the memory 334, the memory 335, the memory 336, the temperature detection means 337 and a counter 339 described later. The counter 339 counts the number of rising edges or falling edges of the pulse waveform outputted from the comparator 331.

Specifically, the calculation means 338 calculates as described below.

A fundamental equation for calculating the angular velocity $\Omega$ is the same as the equation (2) described in the first embodiment. According to the clocks of 1 kHz generated by the clock generation means 332, the calculation means 338 reads the count data from the timer 333 at intervals of 1 msec. The count data outputted from the timer 333 is data of a newest period of a beat frequency outputted from the gyroscope 20 as in the second embodiment. The count data can be converted into frequency information in a Hz unit by conversion processing which multiplies a reverse number of the count data by a factor of 20000000 as in the second embodiment.

Since the information of the sensitivity S to be stored into the memory 334 is 3.378 Hz/(degree/second) in the ring laser gyroscope, this information can be stored into the memory 334. However, industrial products generally have individual manufacturing errors and the sensitivity S is also individually variable due to dimensional errors of the ring laser gyroscope as well as errors of a laser oscillating frequency and the like. When these individual variations are not allowable for detection of angular velocities, it is desirable to store into the memory 334 information which has values different for individual bodies or individual layers.

Since the initial value data of the beat frequency at the angular velocity of 0 to be stored into the memory 335 is fo=2 kHz in the ring laser gyroscope, this information can be stored into the memory 335. Since a value of this information varies like that of the sensitivity S due to the dimensional errors as well as errors of a driving current and the like, it is desirable to store of information of the initial value data of the beat frequency at the angular velocity of 0 which has values different for the individual bodies or individual layers.

The data of the beat frequency at the angular velocity of 0 which is to be stored into the memory means 336 is as follows, the calculation means 338 calculates mean value data of beat frequencies actually detected from the ring laser gyroscope for a definite time and stores this data.

When detection of an angular velocity is started, the calculation means 338 calculates an angular velocity $\Omega$ by the equation (2) as in the first and second embodiments according to the clocks generated by the clock generation means 332 using as f an inverse number of the period data input from the timer 333 at intervals of 1 msec., using the data stored in the memory 334 as S and using the data stored in the memory 335 as fo. Furthermore, the calculation means 338 inputs pulse number data from the counter 339 at intervals of a second according to the clocks of 1 Hz outputted from the clock generation means 332. Since this pulse number data is a mean beat frequency of the gyroscope 20 for a second, this data is stored into the memory 336 as data of beat frequency at the angular velocity of 0. Unlike the second embodiment, storage of the pulse number data makes it unnecessary for the calculation means 338 to calculate a mean of a total sum.

When the data of the beat frequency at the angular velocity of 0 is stored into the memory 336, the calculation means 338 calculates an angular velocity $\Omega$ by the equation (2) using the data stored as fo in place of the data stored in the memory 335. When the data stored in the memory 336 is different from the data stored in the memory 335 beyond a definite limit, however, the data stored in the memory 336 is regarded as low in reliability and the data stored in the memory 335 is used.

When an environmental temperature causes a not negligible variation of the data of the sensitivity S or the initial value data of the beat frequency at the angular velocity of 0, this data must be corrected according to temperature data outputted from the temperature detection means 337 as in the first or second embodiment.

[Application]

Figure 6:
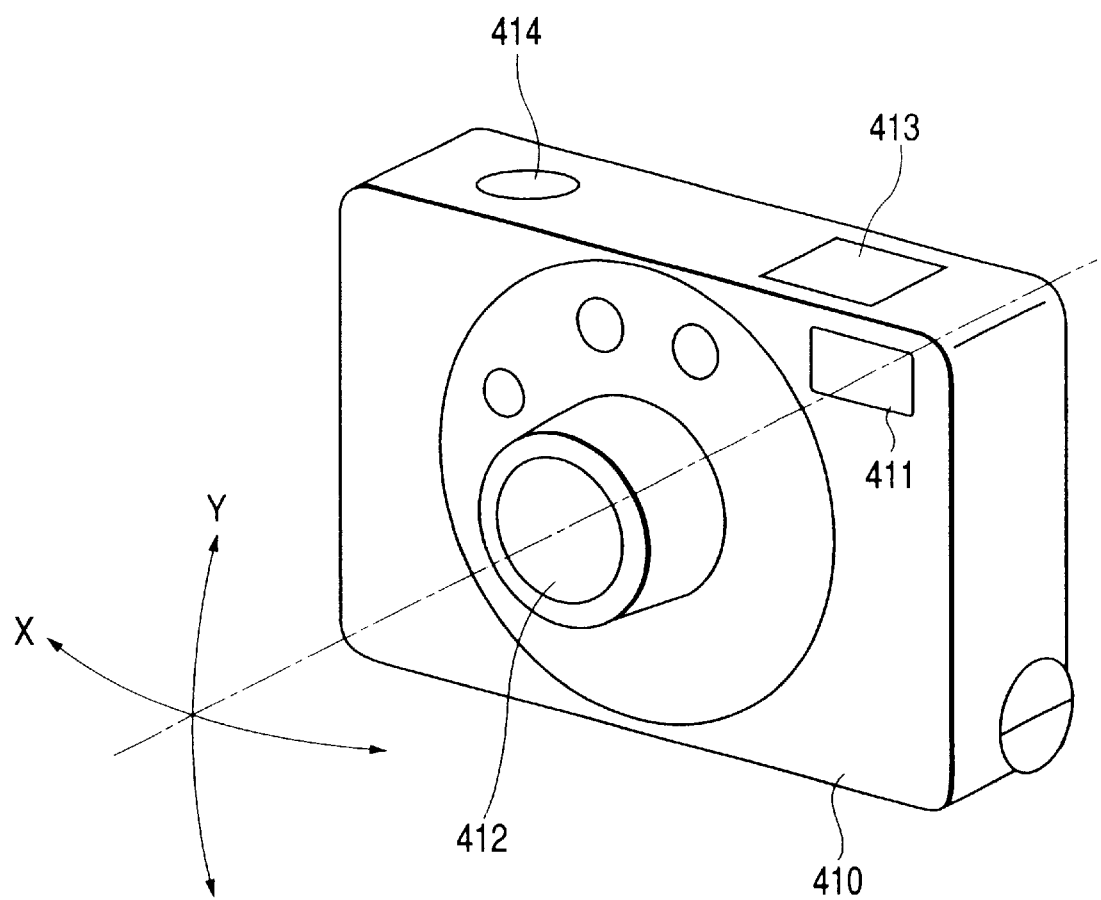
FIG. 6 is a perspective view of a camera in which the angular velocity detector according to the present invention is built.

FIG. 6 is a perspective view of a still camera which uses the ring laser gyroscope, the angular velocity detector using the ring laser gyroscope described in the first through third embodiments and the vibration preventive function. Reference numeral 410 denotes a camera, reference numeral 411 denotes a flash light emitting portion, reference numeral 412 denotes a photographic lens, reference numeral 413 denotes an indicator, reference numeral 414 denotes a shutter button, and known to those skilled in the art is a technique which prevents an image quality from being degraded due to fluctuation by disposing two angular velocity sensors or the like in a camera or a lens for separating and detecting an inclination of an optical axis of the photographic lens 412 in two X and Y directions shown in FIG. 6 and moving some lenses in photographic optical system on the basis of a detected result.

Figure 7A:
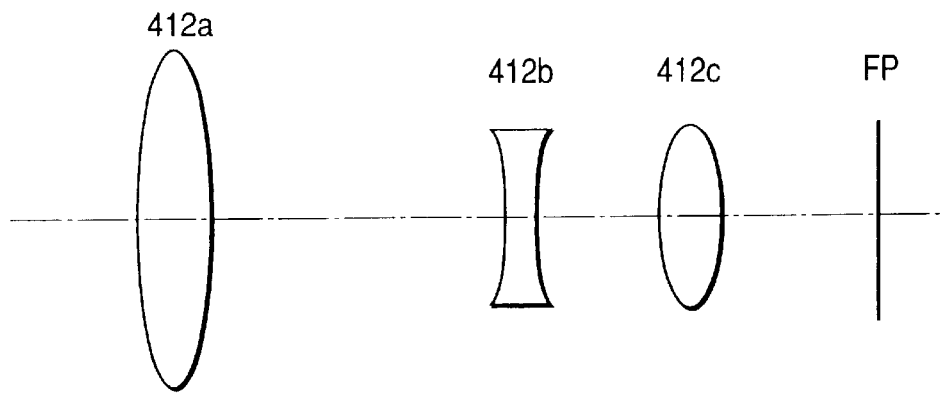
FIGS. 7A, 7B and 7C are diagrams showing an optical path descriptive of correction of fluctuation of a camera shown in FIG. 6.
Figure 7B:
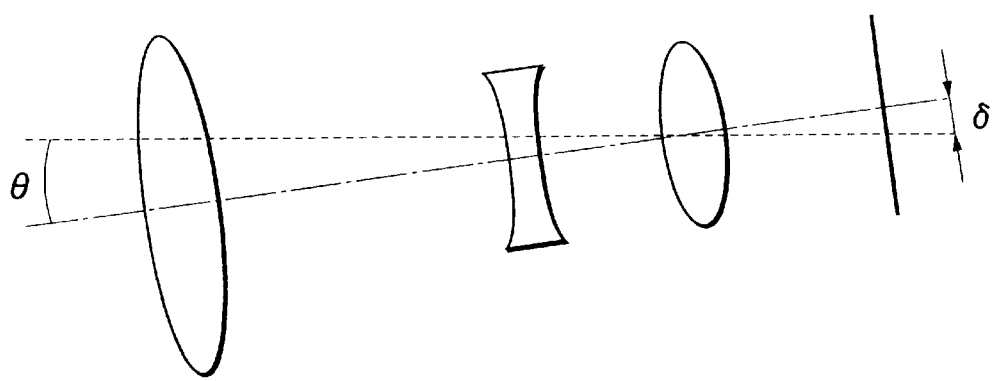
Figure 7C:
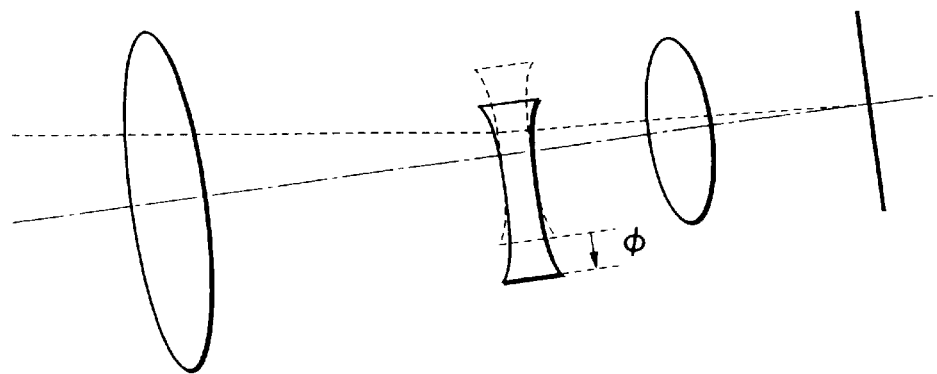

FIGS. 7A, 7B and 7C are diagrams descriptive of a photographic lens having a blur preventive mechanism.

A condition where an image is free from blur is shown in FIG. 7A in which a photographic lens system consists of a first group denoted by reference numeral 412a, a second group denoted by reference numeral 412b and a third group denoted by reference numeral 412c, and reference characters FP denote a film surface. Out of these lens groups, the second group is an optical system which is movable in a direction perpendicular to an optical axis and called as a correction system.

FIG. 7B shows a condition where a camera is fluctuated or the optical axis which is inclined at an angle $\theta$ and produces image blur $\delta$ on the film surface.

FIG. 7C shows a condition where the image blur is corrected or the image blur $\delta$ is corrected by shifting only the second lens group for a distance $\phi$.

Though only an axis is shown in FIGS. 7A, 7B and 7C, image blur can be corrected in two directions when such detection system and correction system are disposed for two axes in an X direction and a Y direction.

Figure 8:
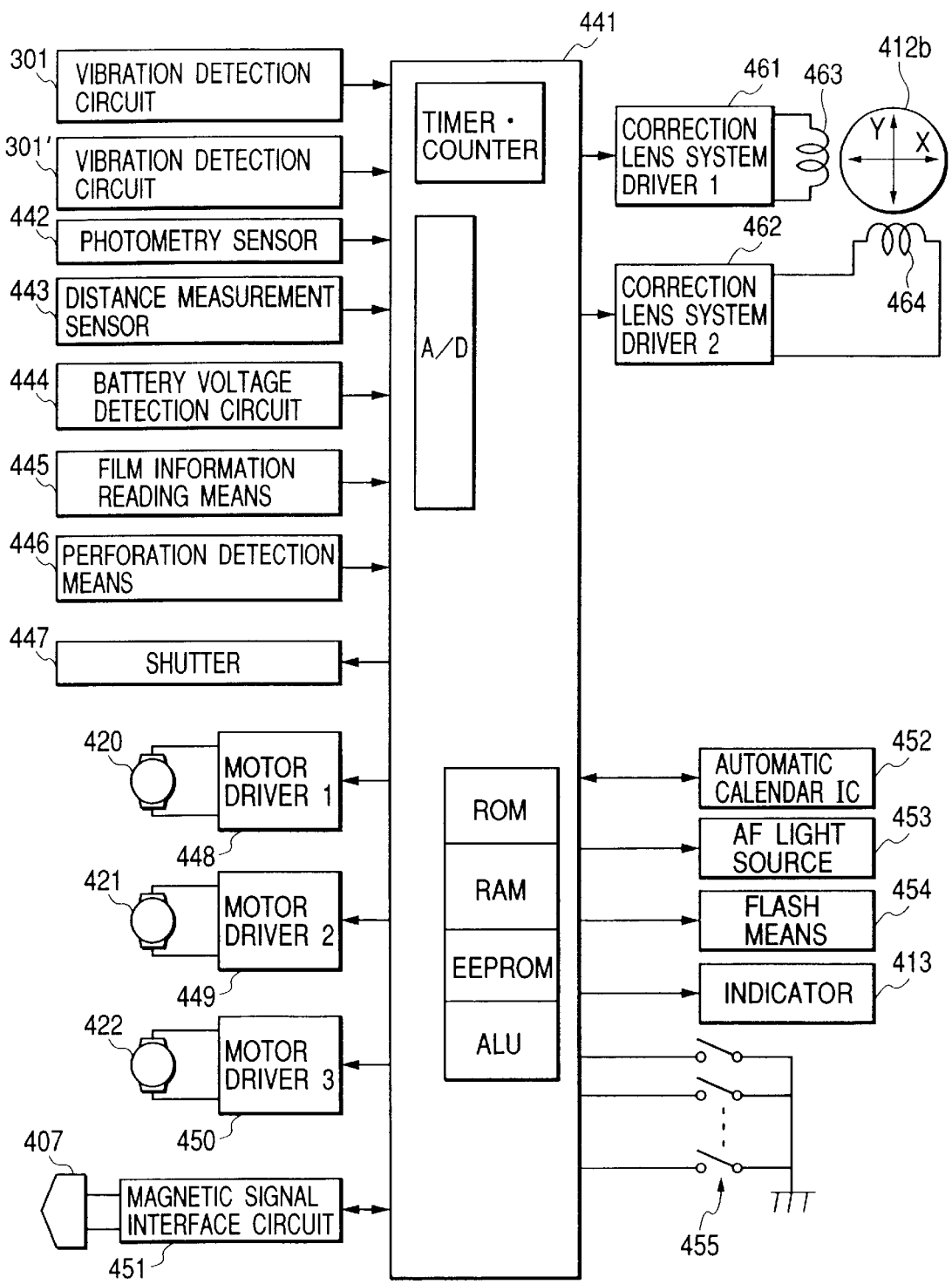
FIG. 8 is a block diagram of a circuit to be used in the camera shown in FIG. 6.

FIG. 8 is a block diagram showing an example of configuration of an electric circuit in the camera in this application example.

Reference numeral 441 denotes control means composed of a microcomputer or the like which comprises an ALU, a ROM, a RAM, an EEPROM, a timer counter and an A/D converter and controls an entire camera mechanism including the blur correction system. Reference numeral 442 denotes a photometry sensor for obtaining luminance information of an object to be photographed which consists of a photodiode and an amplifier, for example, and is connected to an A/D converter input terminal of the control means 441. Reference numeral 443 denotes a distance measuring sensor for obtaining information of a distance to the object to be photographed which consists of a sensor such as a PSD or a CCD and a signal processing portion, for example, and is connected also to the A/D converter input terminal of the control means 441. Reference numeral 444 denotes a battery voltage detection circuit which outputs information of a voltage of a battery which functions as a power source of the camera and is connected to the A/D converter of the control means 441. Reference numeral 445 denotes film information reading means for reading film information which is disposed in a film cartridge and consists of a photoreflector, for example, and an output of the film information reading means 445 is connected to an A/D converter input terminal of the control means 441. Reference numeral 446 denotes perforation detection means for detecting film perforation which consists of a photo-reflector or the like and an output of the perforation detection means 446 is connected to the A/D converter input terminal of the control means 441.

Reference numeral 447 denotes a shutter which is connected to an output terminal of the control means 441 for control. Reference numeral 448 denotes a first motor driver which is connected to the output terminal of the control means 441 for control and drives a first motor 420 for film winding and rewinding. Reference numeral 449 denotes a second motor driver which is connected to the output terminal of the control means 441 for control and drives a second motor 421 which is connected to the output terminal of the control means 441 for control and drives a second motor for opening and closing a light shielding cover (not shown) of the film cartridge. Reference numeral 450 denotes a third motor driver which is connected to the output terminal of the control means 441 for control and drives a third motor 422 for adjusting a focal point of the photographic lens.

Reference numeral 451 denotes a magnetic signal interface circuit which receives an output signal from the control means 441 and gives an optimum recording current corresponding to the signal to photographic information input/output means 407 for recording information on a photographic information recording area of the film. Furthermore, the magnetic signal interface circuit 451 appropriately amplifies a signal reproduced by the photographic information input/output means 407, filters or shapes a waveform as occasion demands and output the signal to the control means 441 for reproducing the information recorded on the photographic information recording area of the film.

Reference numeral 452 denotes an automatic calendar IC which consists of a quartz oscillator and an integrated circuit for clock, and automatically counts calendar information such as year, month, day, hour and minute independently of an operation of the control means 441. Counted information is connected so that the control means 441 can read at any time. Reference numeral 453 denotes an AF light source which projects infrared rays or the like to an object to be photographed when information of a distance to the object to be photographed is to be obtained from the distance measuring sensor 443 and is glowed according to an output signal from the control means 441. Reference numeral 454 denotes flash means which emits light at photographing time when luminance is insufficient on the object to be photographed and is glowed according to an output of the control means 441. Reference numeral 413 denotes the indicator consisting of the liquid crystal panel or the like described with reference to FIG. 9 and having segments which are ignited and controlled according to output signals of the control means 441 for displaying various kinds of information of the camera. Reference numeral 455 denotes various kinds of switches including various kinds of operation switches such as a shutter button and a rewinding switch as well as detection switches such as a cartridge presence/absence detection switch and light shielding cover open/closed detection switch.

Reference numerals 301 and 301' denote fluctuation detection circuits which are applicable to any of the angular velocity detection circuits in the first through third embodiments. The fluctuation detection circuits 301 and 301' detects rotational angular velocities in the X direction and the Y direction respectively. However, the control means 441 can also serve as the calculation means 318, 328 or 338 already described. Since integrated circuits such as a microcomputer generally have hardware having functions of memories such as a ROM, a RAM and an EEPROM as well as a function of a timer counter, the control means can serve also as the memories and the timer counter already described.

Reference numeral 461 denotes a first correction lens system driver which is connected to the output terminal of the control means 441 for control and supplies electric power to a driving coil 463 of the first correction lens system driver. When the electric power is supplied to the driving coil 463 of the first correction lens system driver, a correction lens system 412b moves in the Y direction for a distance corresponding to an amount of the supplied electric power. Reference numeral 462 denotes a second correction lens system driver which is connected to the output terminal of the control means 441 for control and supplies electric power to a driving coil 464 of the second correction lens system driver. When the electric power is supplied to the driving coil 464 of the second correction lens system driver, a correction lens system 412b moves in the X direction for a distance corresponding to an amount of the supplied electric power.

Figure 9:
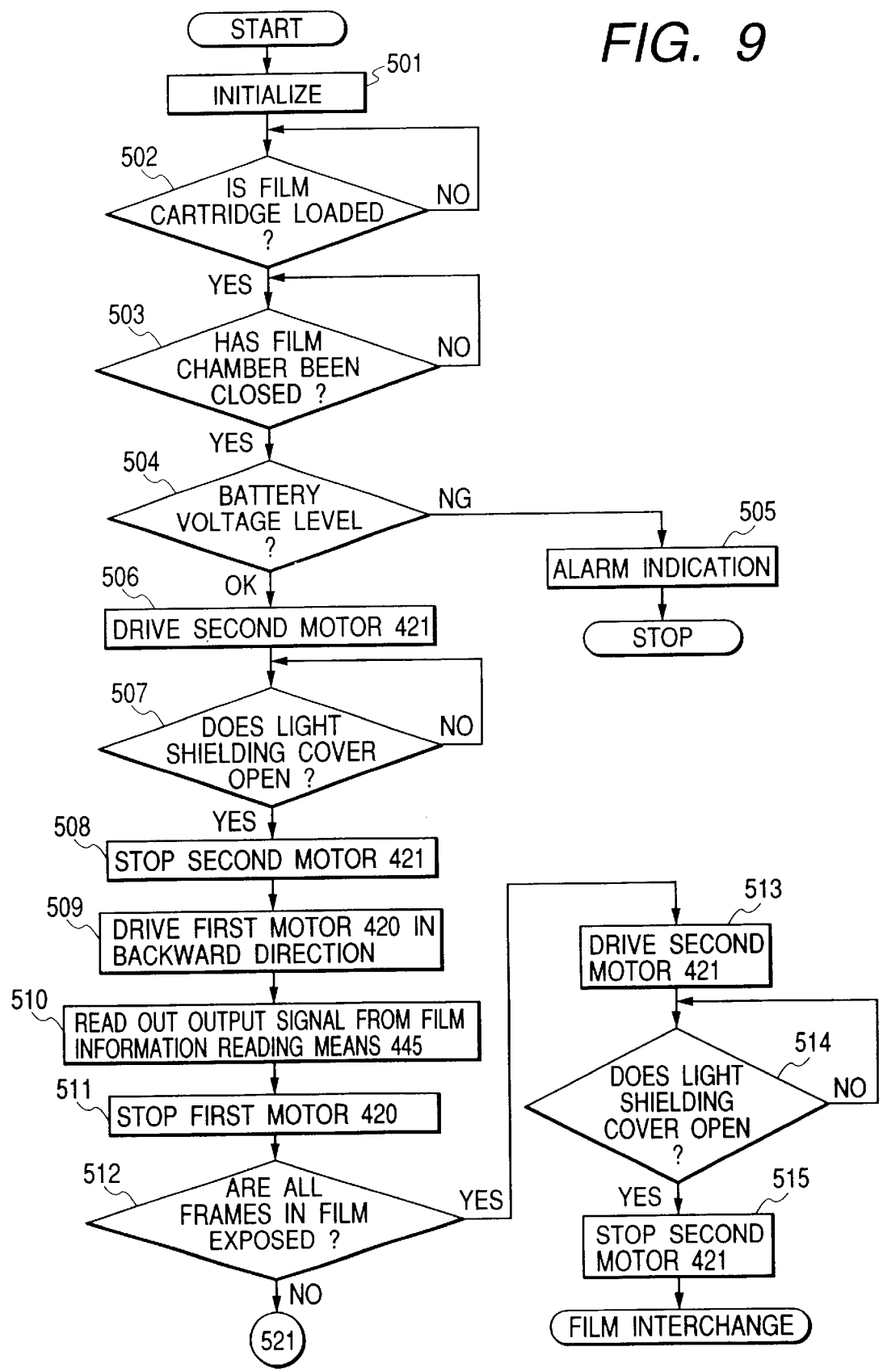
FIG. 9 is flow chart descriptive of operations of control means for the circuit shown in FIG. 8.

FIG. 9 is a flow chart descriptive of operations of the control means 441 of the camera. When a power switch (not shown) is turned on to set the control means ready for operation, the control means 441 executes a step (501).

At the step (501), the control means 441 initializes memories and ports of the control means itself.

At a step (502), the control means 441 detects whether or not the film cartridge is loaded dependently on a signal from the cartridge presence/absence detection switch (not shown). When the film cartridge is loaded, the control means 441 proceeds to a step (503).

At a step (503), the control means 441 waits until a film chamber of the camera is closed. When the film chamber is closed, the control means 441 proceeds to a step (504).

At the step (504), the control means 441 checks whether or not a battery voltage is sufficient for operating the camera by performing A/D conversion of an output signal from a battery voltage detection circuit 444. When the battery voltage is judged as insufficient, the control means 441 proceeds to a step (505).

At the step (505), the control means 441 outputs a warning indication to the indicator 413 to notify that the battery is defective and stops subsequent operations. When the battery is replaced, the control means 441 executes the executes the operation from the step (501).

When the battery voltage is sufficient, the control means 441 proceeds from the step (504) to a step (506).

At the step (506), the control means 441 outputs a control signal to the second motor driver to drive the second motor 421.

At a step (507), the control means detects whether or not the light shielding cover of the film cartridge is open dependently on a signal from the light shielding cover open/closed switch (not shown). When the control means 441 detects the light shielding cover which is open, the control means 441 proceeds to a step (508).

At the step (508), the control means 441 outputs a control signal to the second motor driver 447 to stop the second motor 421.

At a step (509), the control means 441 outputs a control signal to the first motor driver 448 to drive the first motor 420 in a reverse direction. Accordingly, an information display panel (not shown) disposed on the film cartridge starts rotating. No film is fed since the motor 420 is rotating in the reverse direction.

At a step (510), the control means 441 reads an output signal from the film information reading means 445. Information such as a kind of film, a sensitivity and the number of photographed or exposed frames of a film and information of a photographing condition of the film are obtained by decoding the read signal.

At a step (511), the control means 441 outputs a control signal to the first motor driver 448 to stop the first motor 420.

At a step (512), the control means 441 checks whether or not all frames of the film have been exposed. When all the frames of the film have been exposed, the control means 441 proceeds to a step (513).

At the step (513), the control means 441 outputs a control signal to the second motor driver 449 to drive the second motor 421.

At a step (514), the control means 441 detects whether or not the light shielding cover is closed dependently on the signal from the light shielding cover detection switch. When the control means 441 detects the light shielding cover which is closed, the control means proceeds to a step (515).

At the step (515), control means 441 outputs a control signal to the second motor driver 449 to stop the second motor 421. Then, the control means waits until the film is replaced.

Figure 10:
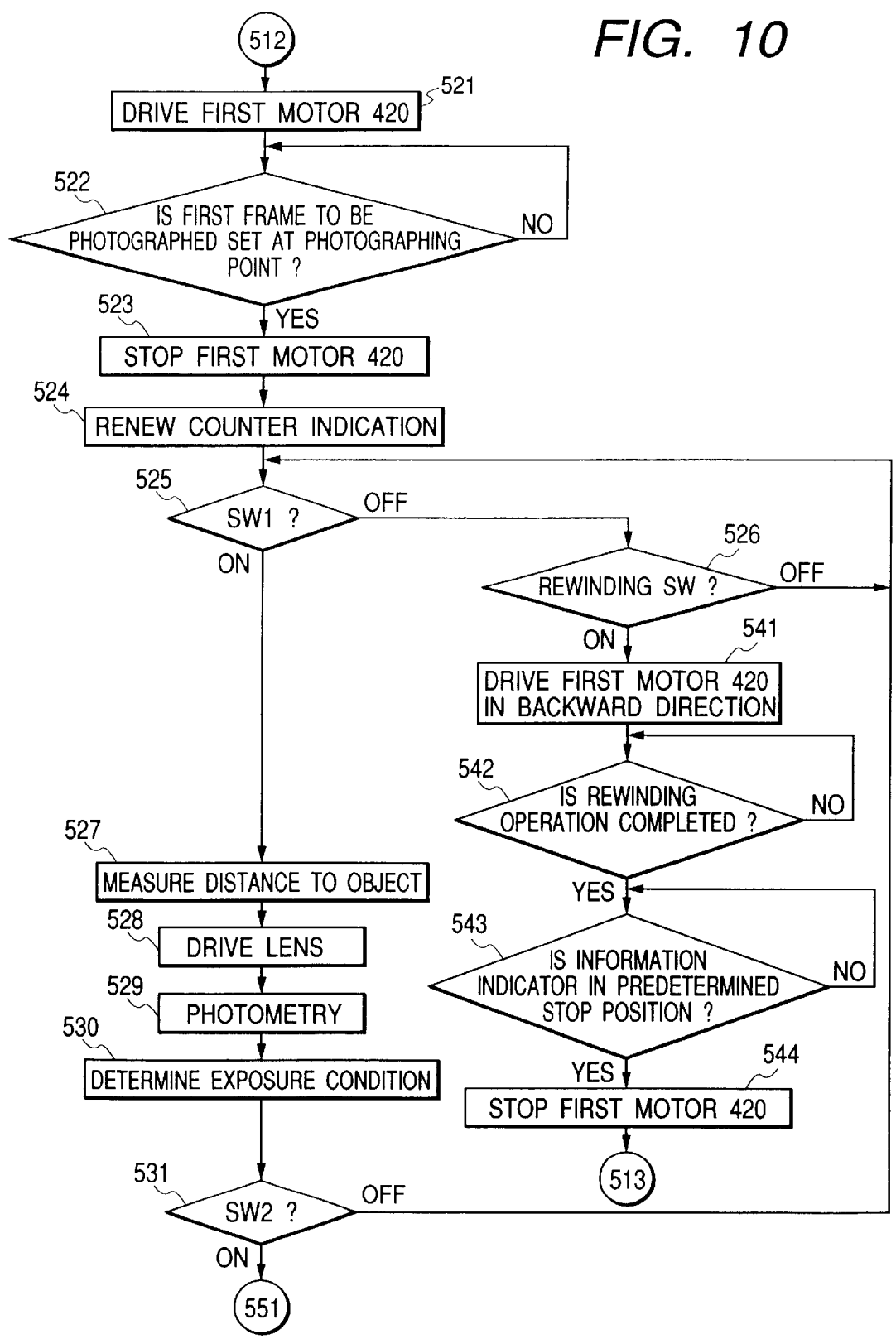
FIG. 10 is a flow chart descriptive of film loading.

FIG. 10 is a flow chart showing an operation sequence of the control means 441 when all the frames of the film have not been exposed at the above described step (512). When all the frames of the film have not been exposed, the control means 441 proceeds to a step (521) and executes film loading.

At the step (521), the control means 441 outputs a control signal to the first motor driver 448 to rotate the first motor 420 in a normal direction. Accordingly, film feeding is started.

At a step (522), the control means 441 waits until a first frame of the film is set at a predetermined photographing location according to a signal from 110 the perforation detection means 446.

At a step (523), the control means 441 outputs a control signal to the first motor driver 448 to stop the first motor 420.

At a step (524), the control means 441 updates a value indicated by the film counter which is to be displayed on the indicator 413. Since a new film is loaded at this time, the indicator 413 displays "1."

At a step (525), the control means 441 checks whether or not a switch SW1 which is to be turned on with a first stroke of the shutter button has been turned on. When the switch SW1 has not been turned on yet, the control means 441 proceeds to a step (526).

At the step (526), the control means 441 checks whether or not a rewinding switch is turned on. When the rewinding switch is not turned on, the control means 441 returns to the step (525).

When the switch SW1 has been turned on, the control means 441 proceeds from the step (525) to a step (527).

At the step (527), the control means 441 obtain information of a distance to an object to be photographed by information input from the distance measuring sensor 443.

Furthermore, the control means 441 calculates a lens driving distance required for bringing the photographic lens into focus according to the obtained information of the distance to the object to be photographed.

At a step (528), the control means outputs a signal to the third motor driver 450 to drive a focusing lens according to the calculated lens driving distance, thereby driving the third motor 422.

At a step (529), the control means 441 obtains luminance information of the object to be photographed by information input from the photometry sensor 442.

At a step (530), the control means 441 determines a shutter speed, a stop value and the like for exposure according to obtained luminance information of the object to be photographed and the film sensitivity information already obtained at the step (510). At this step, the control means 441 also determines whether or not the flash means 454 is to be used for photographing.

At a step (531), the control means 441 checks whether or not a switch SW2 which is to be turned on with a second stroke of the shutter button has been turned on. When the switch SW2 has not been turned on yet, the control means 441 returns to the step (525) and repeats the above described operations shown in the flow chart.

When the control means 441 detects the rewinding switch which is turned on at the above described step (526), the control means 441 proceeds to a step (541).

At the step (541), the control means 441 outputs a control signal to the first motor driver 448 to drive the first motor 420 in the reverse direction. Accordingly, film rewinding is started.

At a step (542), the control means waits until the film is completely rewound according to a signal from the perforation detection means 446 or the like.

At a step (543), the control means 441 waits the information display panel is set at a predetermined pause location while reading an output signal from the film information reading means 445.

At a step (544), the control means 441 outputs a control signal to the first motor driver 448 to stop the first motor 420. Then, the control means 441 proceeds to steps (513) and later shown in FIG. 9 and waits until the film is taken out.

Figure 11:
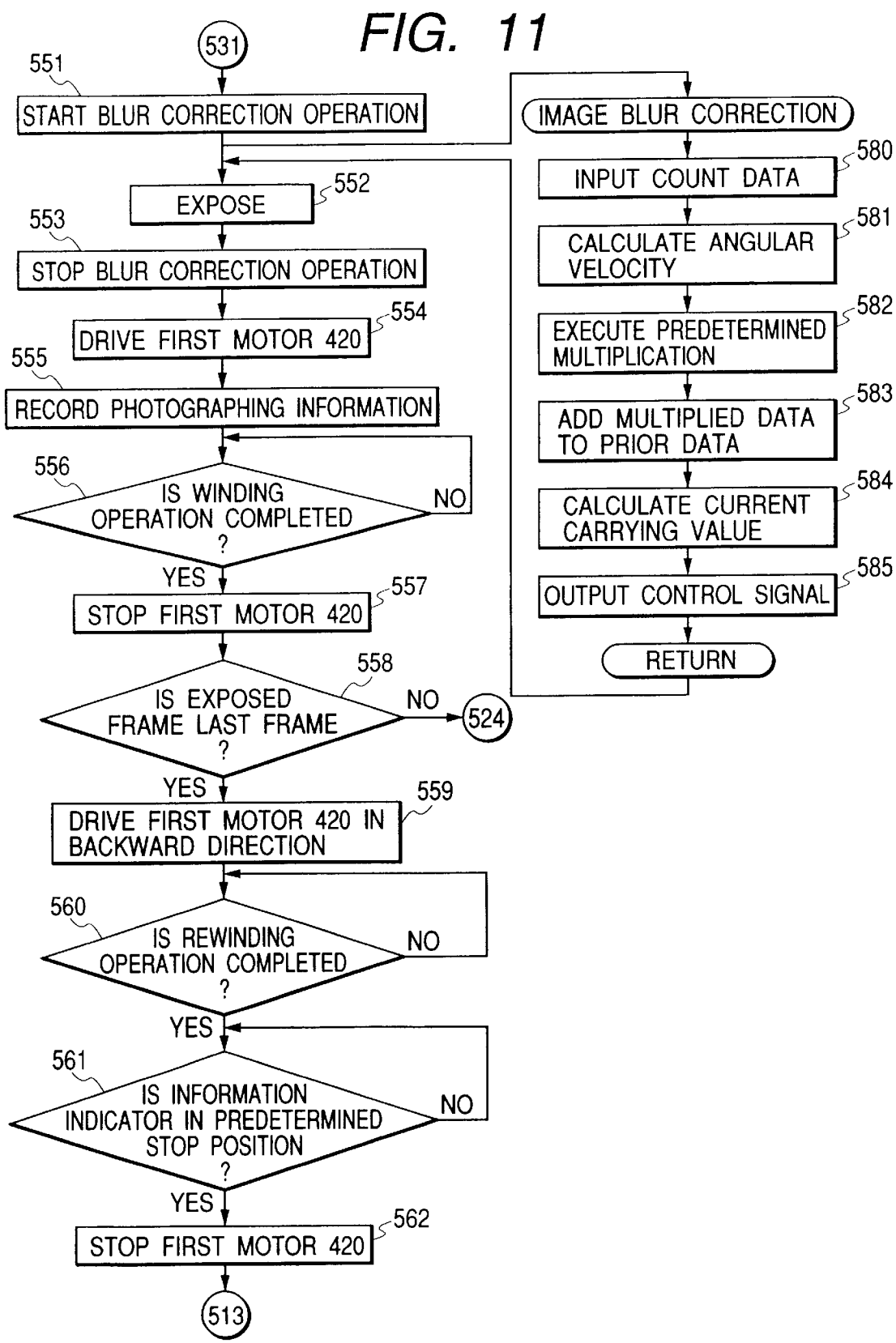
FIG. 11 is a flow chart descriptive of processings including correction of fluctuation.

FIG. 11 is a flow chart showing an operation sequence of the control means 441 when the switch SW2 which is turned on with the second stroke of the shutter button is turned on at the step (531). When the switch SW2 is turned on, the control means 441 proceeds to a step (551).

At the step (551), the control means 441 permits processings for a blur correction operation. The microcomputer performs the processings for the blur correction operation at a definite intervals of 1 msec. with a timer interrupt function. When a timer interrupt occurs, the control means 441 starts the processings for the blur correction operation shown in the flow chart. Upon occurrence of the timer interrupt, the control means 441 shifts to a step (580).

At the step (580), the control means 441 inputs from the counter timer count data which is to be outputted from the fluctuation detection circuits 301 and 301'.

At a step (581), the control means 441 determines from the above described count data a beat frequency f which is to be outputted from the gyroscope, and calculates angular velocities $\Omega$ in the X direction and the Y direction by the equation (2) as in the first through third embodiments on the basis of a beat frequency fo outputted from the gyroscope in conditions of the sensitivity S and the angular velocity 0 stored in the memories.

At a step (582), the control means 441 executes a predetermined multiplication of obtained digital angular velocity data.

At a step (583), the control means 441 adds a result obtained by the multiplication to a prior result. When the multiplication is a first multiplication, the control means 441 adds the result to a predetermined initial value. By repeating such processings, angular velocity data is integrated into angle displacement data δ, that is, data indicating an angle θ of the blur shown in FIG. 7B.

At a step (584), control means 441 calculates electric power to be supplied to the driving coil 463 of the first correction lens system driver and the driving coil 464 of the second correction lens system driver 462 which is optimum for moving the correction lens system 412b a distance φ to correct the blur in correspondence to the angle displacement data δ.

At a step (585), the control means 441 outputs control signals to the first correction lens system driver 461 and the second correction lens system driver 462 on the basis of the calculated electric power.

Operations for the blur correction are carried out at a definite period and then the control means 441 performs a processing at a step (552).

At the step (552), the control means 441 controls the shutter 447 according to exposure determined at the above described step (530). When it has been determined to use the flash means 454, the control means outputs a control signal to glow the flash means 454. The film is exposed accordingly.

When exposure completes at a step (553), the control means 441 terminates the blur correction operation by inhibiting the timer interrupt for the blur correction which was permitted at the step (551).

At a step (554), the control means 441 outputs a control signal to the first motor driver 448 to rotatingly drive the first motor 420 in the normal direction. Now, film winding is started.

At a step (555), the control means 441 outputs a signal to the magnetic signal interface circuit 451 so that various kinds of photographing information such as year, month, day, hour, minute and the like is recorded on a magnetic track of the film.

At a step (556), the control means 441 waits until recording of the photographing information is recorded and a next photographing frame is set at a predetermined photographing location according to a signal from the perforation detection means 446.

At a step (557), the control means 441 outputs a control signal to the first motor driver 448 to stop the first motor 420.

At a step (558), the control means 441 checks whether or not photographing has completed in the final frame. When photographing has not been completed in the final frame, the control means returns to the step (524) and repeats the above described operation sequence. When photographing in the final frame has been completed, the control means 441 proceeds to a step (559).

At the step (559), the control means 441 outputs a control signal to the first motor driver 448 to rotatingly drive the first motor 420 in the reverse direction. Film rewinding is started accordingly.

At a step (560), the control means 441 waits until the film is rewound completely into the cartridge according to a signal from the perforation detection means 446 or the like.

At a step (561), the control means 441 waits until the information display panel is set at a predetermined pause location indicating completion of exposure while reading output a signal from the film information reading means 445.

At a step (562), the control means 441 outputs a control signal to the first motor driver 448 to stop the first motor 420.

Then, the control means 441 proceeds to the steps on and after (513), waiting until the film is taken out.

While the embodiments of the present invention have been described above, the sampling intervals of 1 msec., numerical values of the beat frequencies and the like are illustrative examples, and the present invention is not limited by such numerical values.

Furthermore, the angular velocity detector is applicable not only to cameras but also various appliances such as navigation appliances and amusement appliances.

Furthermore, it is conceivable to detect beat frequencies produced by gyroscopes not only as a voltage as described in this specification but also as a current or impedance.

The present invention uses a processing circuit which comprises substantially no analog circuit and is suited for integrating circuit by using semiconductor integration process such as CMOS process as described above, thereby making it possible to realize an angular velocity detector which can easily be mounted on compact electronic appliances.

Furthermore, the present invention makes it possible to detect angular velocities always accurately even when gyroscopes has individual manufacturing variations or when characteristics of the gyroscopes are changed due to variations in environments of use.

What is claimed is:

1. An angular velocity detector comprising;
    a ring laser including a tapered light waveguide path which has an asymmetrical shape at least in a portion of the light waveguide path so that oscillation threshold values of laser beams propagating circumferentially in rotational directions opposite to each other are different;
    an optical gyroscope having a terminal which detects a change of at least one of a current, a voltage and impedance of said ring laser;
    a measuring device which measures data of a period of the change of at least one of the current, the voltage and impedance outputted from the terminal of optical gyroscope;
    a memory device which memorizes initial data of the period of the change of at least one of the current, the voltage and impedance outputted from said terminal of said optical gyroscope; and
    a calculation circuit to which is inputted the data measured by said measuring device and the initial data, and which performs calculation on information of an angular velocity.

2. The angular velocity detector according to claim 1, further comprising:
    a memory device which memorizes data of a sensitivity of said optical gyroscope,
    wherein said calculation circuit is inputted the data measured by said measuring device, the initial data and the data of the sensitivity of said optical gyroscope, and performs calculation information of an angular velocity.

3. The angular velocity detector according to claim 2, further comprising:
    a temperature detection device,
    wherein said calculation circuit corrects the data of the sensitivity of said optical gyroscope according to detected temperature information, and performs calculation on information of an angular velocity.

4. The angular velocity detector according to claim 1, further comprising:

a temperature detection device, wherein said calculation circuit corrects the initial data according to detected temperature information, and performs calculation on information of an angular velocity.

5. The angular velocity detector according to claim 1, wherein the initial data is data of the period of the change of at least one of the current, the voltage and the impedance outputted from the terminal in a condition where said optical gyroscope is not subjected to an angular velocity.

6. The angular velocity detector according to claim 1, wherein the calculation circuit performs calculation on a mean value of data measured by said measuring device for a definite time and corrects the initial data according to the mean value.

7. A navigation device comprising the angular velocity detector of claim 1.

8. A camera comprising the angular velocity detector of claim 1.

9. An angular velocity detector comprising:

a ring laser including a tapered light waveguide path which has an asymmetrical shape at least in a portion of the light waveguide path so that oscillation threshold values of laser beams propagating circumferentially in rotational directions opposite to each other are different;

an optical gyroscope having a terminal which detects a change of at least one of a current, a voltage and impedance of said ring laser;

a measuring device which measures data of a frequency of the change of at least one of the current, the voltage and the impedance outputted from the terminal of said optional gyroscope;

a memory device which memorizes initial data of the frequency of the change of at least one of the current, the voltage and the impedance outputted from said terminal of said optical gyroscope; and a calculation circuit to which is inputted the data measured by said measuring device and the initial data, and which performs calculation on information of an angular velocity.

10. The angular velocity detector according to claim 9, further comprising:

a memory device which memorizes data of a sensitivity of said optical gyroscope;

wherein said calculation circuit is inputted the data measured by said measuring device, the initial data and the data of a sensitivity of said optical gyroscope, and performs calculation information on an angular velocity.

11. The angular velocity detector according to claim 10, further comprising:

a temperature detection device, wherein said calculation circuit corrects the data of a sensitivity of said optical gyroscope according to detected temperature information, and performs calculation on information of an angular velocity.

12. The angular velocity detector according to claim 9, further comprising:

a temperature detection device, wherein said calculation circuit corrects the initial data according to detected temperature information, and performs calculation on information of an angular velocity.

13. The angular velocity detector according to claim 9, wherein the initial data is data of the frequency of the change of at least one of the current, the voltage and the impedance outputted from the terminal in a condition where said optical gyroscope is not subjected to an angular velocity.

14. The angular velocity detector according to claim 9, wherein the initial data is data of the frequency of the change of at least one of the current, the voltage and the impedance outputted from the terminal in a condition where said optical gyroscope is not subjected to an angular velocity.

15. A navigation device comprising the angular velocity detector of claim 9.

16. A camera comprising the angular velocity detector of claim 9.

* * * * *

UNITED STATES PATENT AND TRADEMARK OFFICE
CERTIFICATE OF CORRECTION

PATENT NO. : 6,465,771 B2
DATED : October 15, 2002
INVENTOR(S) : Toshifumi Ohsawa It is certified that error appears in the above-identified patent and that said Letters Patent is hereby corrected as shown below:

Column 7,
Lines 45, 46 and 48, "InGaAsp" should read -- InGaAsP --
Line 49, "p-Inp" should read -- p-InP --
Line 50, "p-InGaAsp" should read -- p-InGaAsP --
Line 51 "n-Inp" should read --n-InP --
Line 54, "photoresist AZ-1350" should read -- Photoresist AZ-1350 --
Lines 55 and 63, "p-Inp" should read -- p-InP --
Line 65, "n-Inp" should read -- n-InP --

Column 8,
Line 31, "Ωmn=+20 degree/second" should read -- Ωmn = -20 degree/second --
Line 33, "Ωmx=+°degrees/second." should read -- Ωmx = +20 degrees/second. --

Column 10,
Line 32, "1000data" should read -- 1000 data --

Signed and Sealed this

Second Day of December, 2003

JAMES E. ROGAN
*Director of the United States Patent and Trademark Office*